(No Model.)

N. KEELER.
POTATO COVERER AND CULTIVATOR.

No. 337,501. Patented Mar. 9, 1886.

Witnesses.
A. Ruppert,
Alfred T. Gage.

Inventor.
Noah Keeler
Per
Thomas P. Simpson

United States Patent Office.

NOAH KEELER, OF WALLACE, NEW YORK.

POTATO COVERER AND CULTIVATOR.

SPECIFICATION forming part of Letters Patent No. 337,501, dated March 9, 1886.

Application filed July 29, 1885. Serial No. 172,964. (No model.)

*To all whom it may concern:*

Be it known that I, NOAH KEELER, a citizen of the United States, residing at Wallace, in the county of Steuben and State of New York, have invented certain new and useful Improvements in Potato Coverers and Cultivators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The invention relates, generally, to the covering of seed with fine earth that will not obstruct the upward growth of the tender shoots, and to the killing of grass and weeds as they start around the stems of the tender plants.

The special object of the invention is to facilitate the covering of seed-potatoes in the furrow with pulverized soil, so that they may be exposed to the most favorable conditions, may germinate quickly, and come up uniformly; also, to smother the grass and weeds which start up around the vine, without running so close to the plant as to injure its roots.

Figure 1:
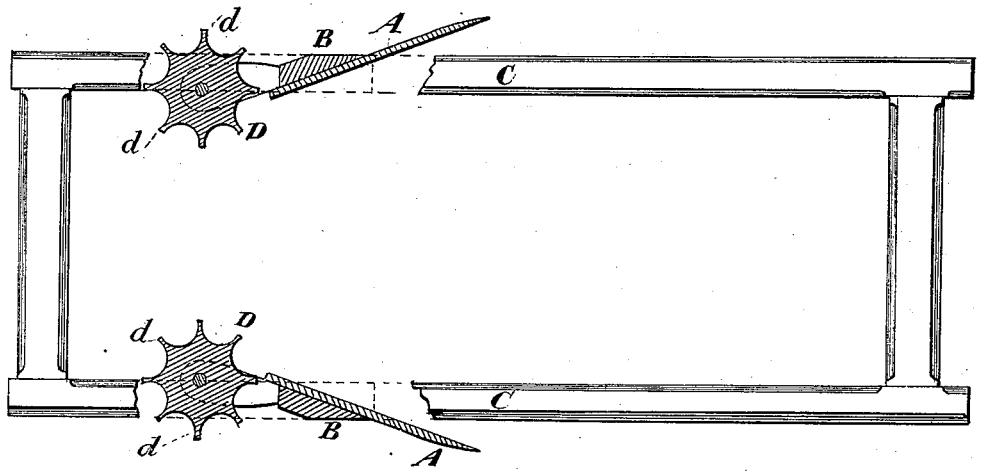
Figure 2:
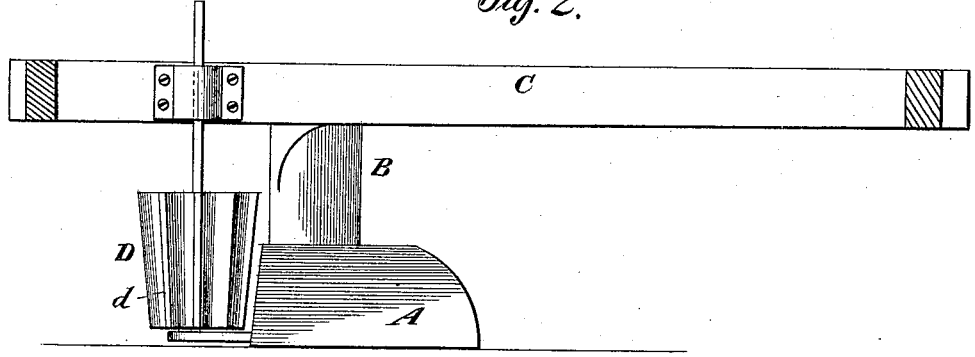
Figure 3:
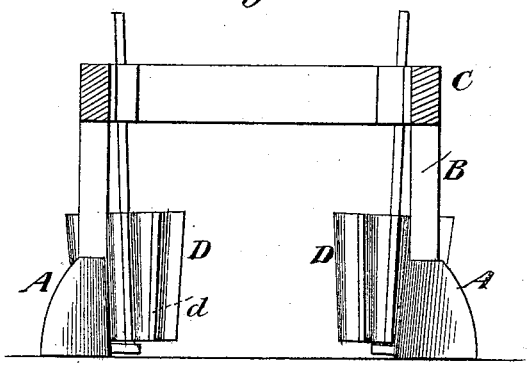

Figure 1 of the drawings is a longitudinal vertical section. Fig. 2 is a vertical cross-section in front of the scrapers. Fig. 3 is a rear elevation.

In the drawings, A A represent scrapers, which are attached to the standards B B, so as to point outwardly and cross obliquely the vertical plane of the beams C C. After the land has been thoroughly prepared and is in fine tilth, the rows which are intended to receive the seed-potatoes are furrowed out at suitable intervals and the seed dropped into them at the desired distance apart. My device is now made to straddle a row, so that the point of the scrapers will run in a median line between the rows, so as to gather the soil inwardly toward the planted furrow on both sides thereof. As the loose earth is scraped inwardly it accumulates and passes against the vertical and rapidly-rotating cylinders D D. These are provided with vertical wings d, which not only strike and break to pieces the small clods, but distribute the fine dirt over the seed, so that there will be no impediment to the coming up or healthy growth of the young plants.

In order to destroy weeds and grass immediately around the stems of the vines, it is usual to run so close as to cut, break, and wound the feed-roots. My object is to avoid this entirely, and to cover up these weeds and grass by throwing the fine dirt scraped from the middle of the row around their stems, thus leaving the feed-roots unharmed. My dirters D D, in conjunction with the scrapers, thus answer two very important purposes in the cultivation of potatoes and other crops grown in rows.

Having thus described my invention, what I claim as new, and desire to protect by Letters Patent, is—

The two forwardly-diverging scraper-plates A A, combined in a potato-coverer with rear cylinders, D D, having wings d, as and for the purpose described.

NOAH KEELER.

Witnesses:
  M. W. HARRIS,
  MONROE HARRIS.